US012424781B2

(12) United States Patent
Bossuyt et al.

(10) Patent No.: US 12,424,781 B2
(45) Date of Patent: Sep. 23, 2025

(54) POWER TERMINAL WITH A MULTILAYERED STRUCTURE AND SET OF POWER TERMINALS HAVING VARIOUS NUMBERS OF LAYERS

(71) Applicant: Aptiv Technologies AG, Schaffhausen (CH)

(72) Inventors: Sylvain Bossuyt, Boutigny Prouais (FR); Quentin Cordier, L+3 Eveque (FR); Patrick J Reedy, Youngstown, OH (US); Nicholas Nicholas Durse, Youngstown, OH (US)

(73) Assignee: APTIV TECHNOLOGIES AG, Schaffhause (CH)

(*) Notice: Subject to any disclaimer, the term of this patent is extended or adjusted under 35 U.S.C. 154(b) by 402 days.

(21) Appl. No.: 18/081,101

(22) Filed: Dec. 14, 2022

(65) Prior Publication Data

US 2023/0246371 A1 Aug. 3, 2023

(30) Foreign Application Priority Data

Jan. 26, 2022 (EP) .................................... 22315023

(51) Int. Cl.
*H01R 13/187* (2006.01)
*H01R 13/24* (2006.01)
*H01R 24/66* (2011.01)

(52) U.S. Cl.
CPC ....... *H01R 13/187* (2013.01); *H01R 13/2407* (2013.01); *H01R 24/66* (2013.01)

(58) Field of Classification Search
CPC .. H01R 13/187; H01R 13/2407; H01R 24/66; H01R 13/10; H01R 13/11; H01R 13/15;
(Continued)

(56) References Cited

U.S. PATENT DOCUMENTS 4,685,019 A * 8/1987 Needham ............... H01H 9/548 218/123
4,891,618 A * 1/1990 Paton .................. H01H 1/5822 218/32

(Continued)

FOREIGN PATENT DOCUMENTS

CN 105580201 A 5/2016
CN 112751228 A 5/2021

(Continued)

OTHER PUBLICATIONS

Extended European Search Report dated Jul. 5, 2022; Application No. 22315023.6; 7 pages.

(Continued)

*Primary Examiner* — Renee S Luebke
*Assistant Examiner* — Paul D Baillargeon
(74) *Attorney, Agent, or Firm* — Billion & Armitage

(57) ABSTRACT

A power terminal includes a contact portion, a connection portion, and an intermediate portion. The contact and intermediate portions include conductive layers stacked along a direction corresponding to their respective thicknesses. The contact portion includes a main top surface and at least one contact area protruding from the main top surface. Each layer in the contact portion includes at least one first embossed region, the at least one first embossed region of each layer being registered with the at least one first embossed region of an adjacent layer, and the at least one first embossed region of a top layer forming the at least one contact area. A set of power terminals including a plurality of such a power terminal and a connector including such a power terminal are also disclosed.

10 Claims, 4 Drawing Sheets

(58) Field of Classification Search
CPC .......... H01R 13/113; H01R 2001/5827; H01H 2209/004; H01H 2001/5827
USPC .................................. 218/146; 200/275, 278
See application file for complete search history.

(56) References Cited

U.S. PATENT DOCUMENTS

| | | | | |
|---|---|---|---|---|
| 7,104,812 | B1 * | 9/2006 | Bogiel | H01R 12/724 439/79 |
| 10,389,055 | B1 * | 8/2019 | Lui | H01R 13/187 |
| 11,264,752 | B1 | 3/2022 | Durse et al. | |
| 11,387,586 | B2 | 7/2022 | Durse et al. | |
| 2020/0244050 | A1 | 7/2020 | Corban et al. | |
| 2020/0313142 | A1 * | 10/2020 | Fabre | H01M 50/505 |
| 2022/0285872 | A1 | 9/2022 | Reedy | |
| 2022/0368052 | A1 | 11/2022 | Durse et al. | |

FOREIGN PATENT DOCUMENTS

| | | | |
|---|---|---|---|
| DE | 472550 | C * | 3/1929 |
| EP | 3719934 | A1 | 10/2020 |
| KR | 20210045320 | A | 4/2021 |
| WO | 2010037410 | A1 | 4/2010 |
| WO | 2013052519 | A2 | 4/2013 |

OTHER PUBLICATIONS

U.S. Appl. No. 17/752,518, filed May 24, 2022.
U.S. Appl. No. 17/884,886, filed Aug. 10, 2022.
HC-Stak High-Voltage Interconnection System; Technical Solution Paper; https://www.te.com/content/dam/te-com/documents/automotive/global/auto-hems-hc-stak-hv-interconnection-system-tech-sol-paper.pdf; Downloaded Nov. 30, 2022., 7 pages.
HC-Stak 25 HV Interconnection System; High Voltage Automotive Interconnection; https://www.te.com/content/dam/te-com/documents/automotive/global/auto-hems-brochure-hc-stak-25-hv-interconnection-system-7-1773984-6.pdf; Downloaded Nov. 30, 2022., 8 pages.

* cited by examiner

[Fig. 1]
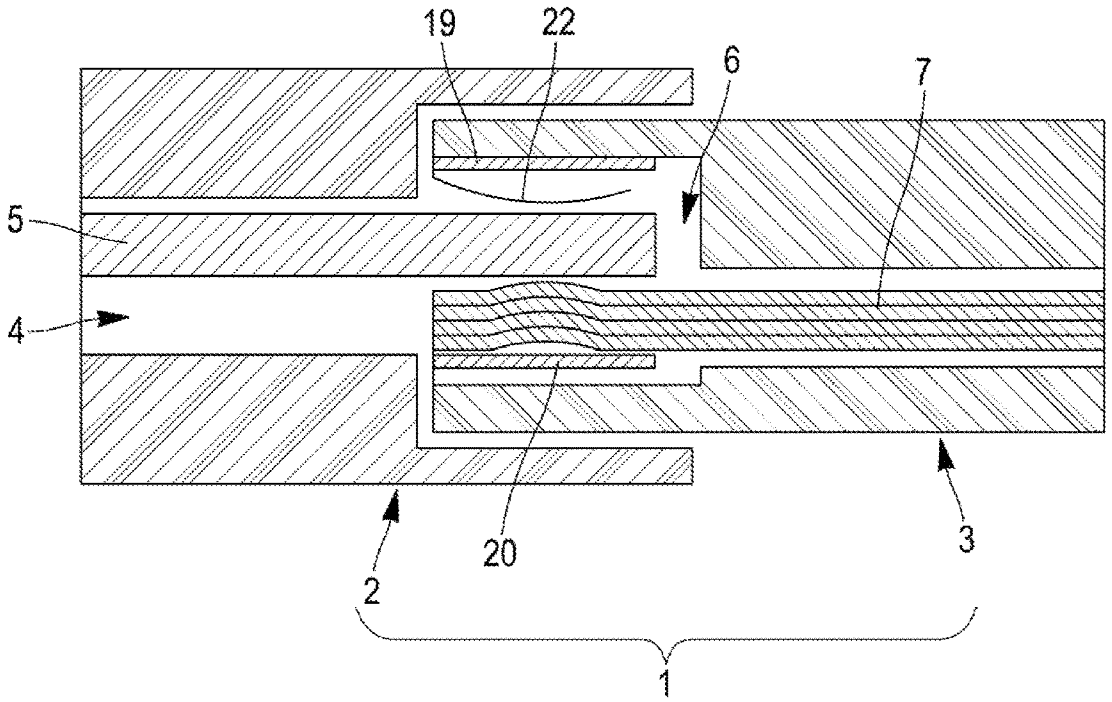
[Fig. 2]
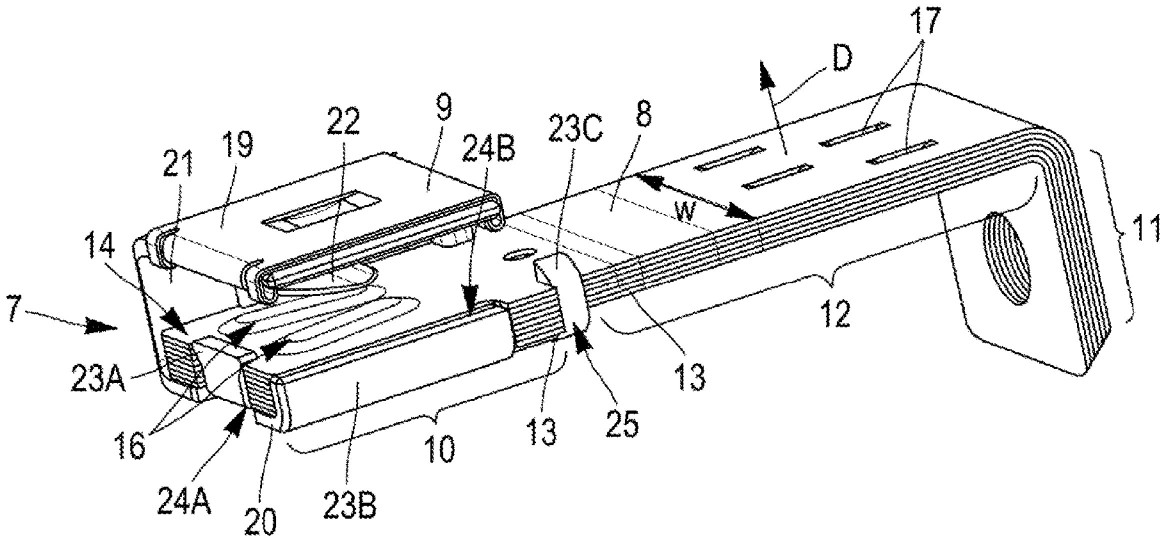

[Fig. 3]
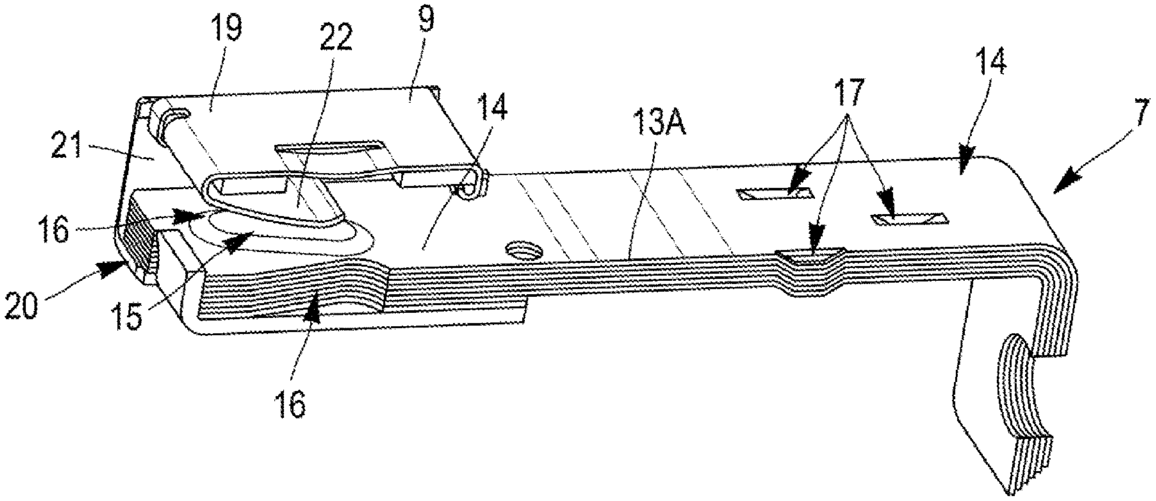
[Fig. 4]
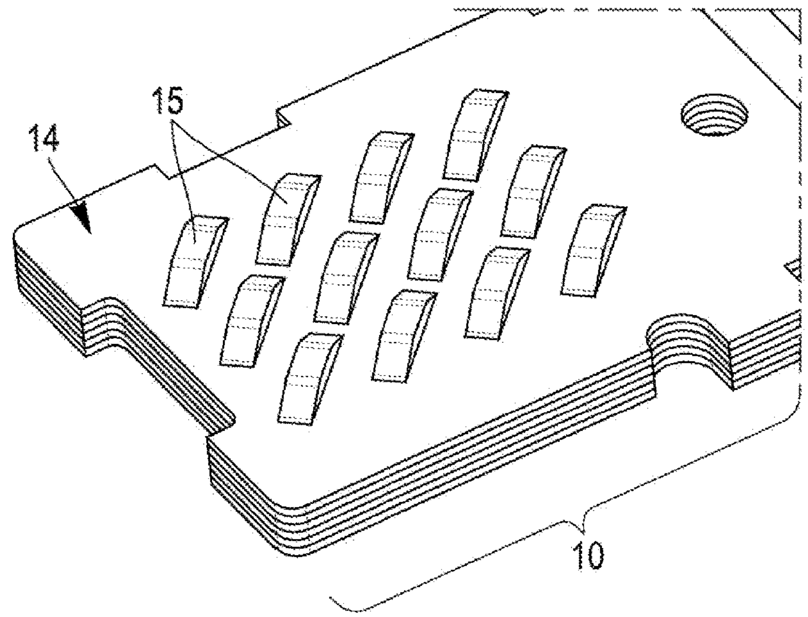

[Fig. 5]
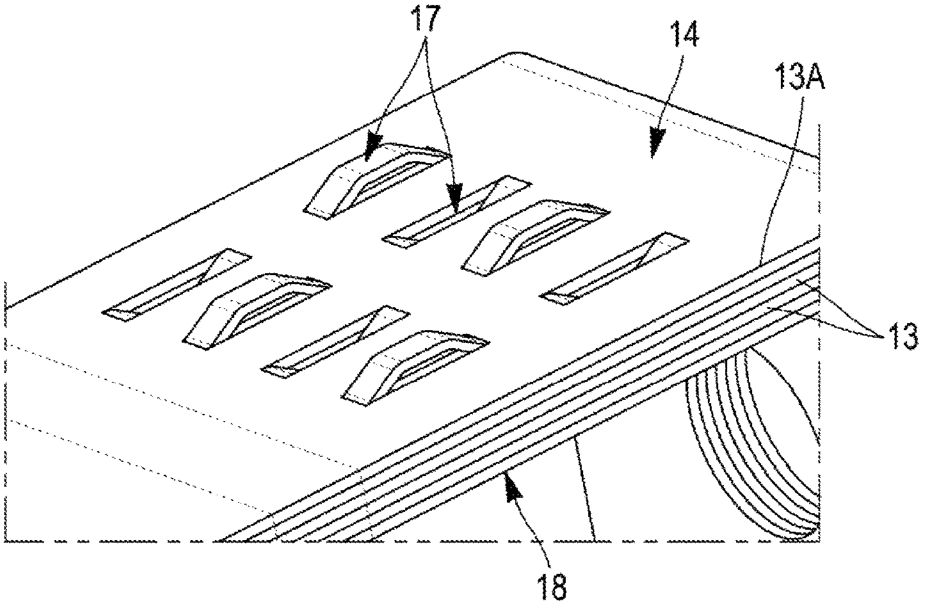
[Fig. 6]
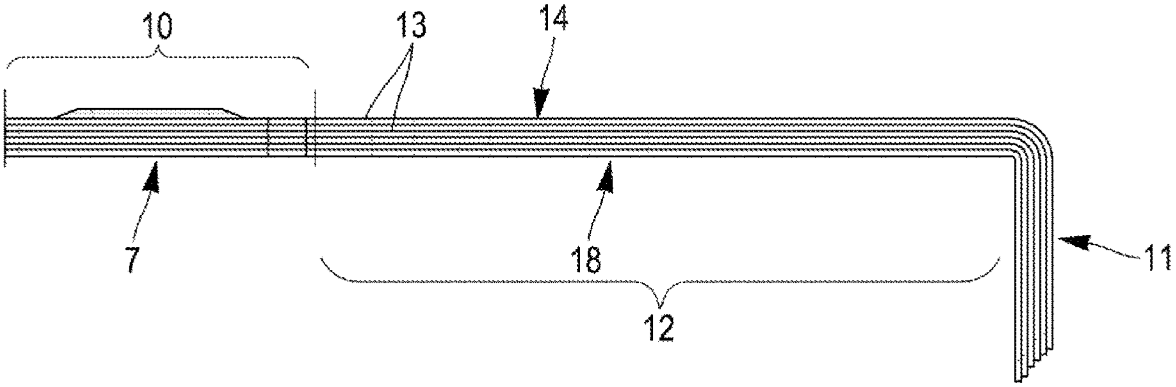
[Fig. 7]
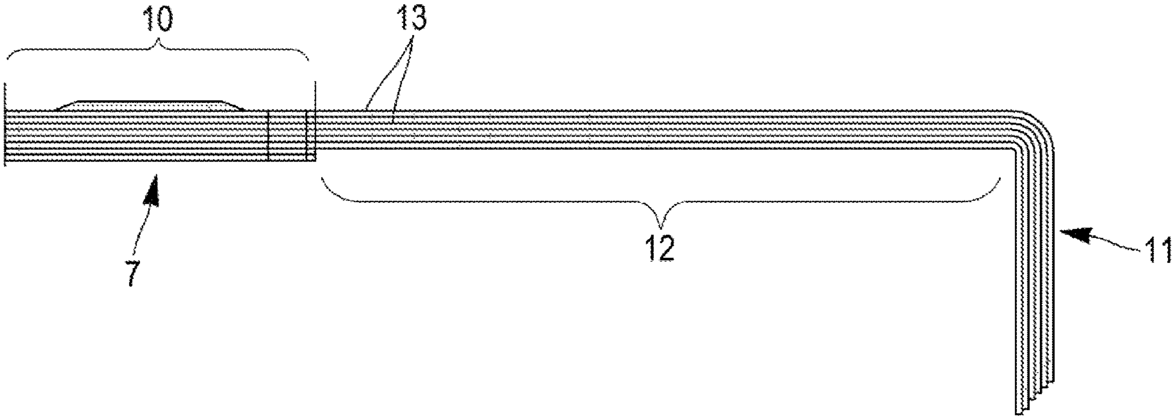

[Fig. 8]
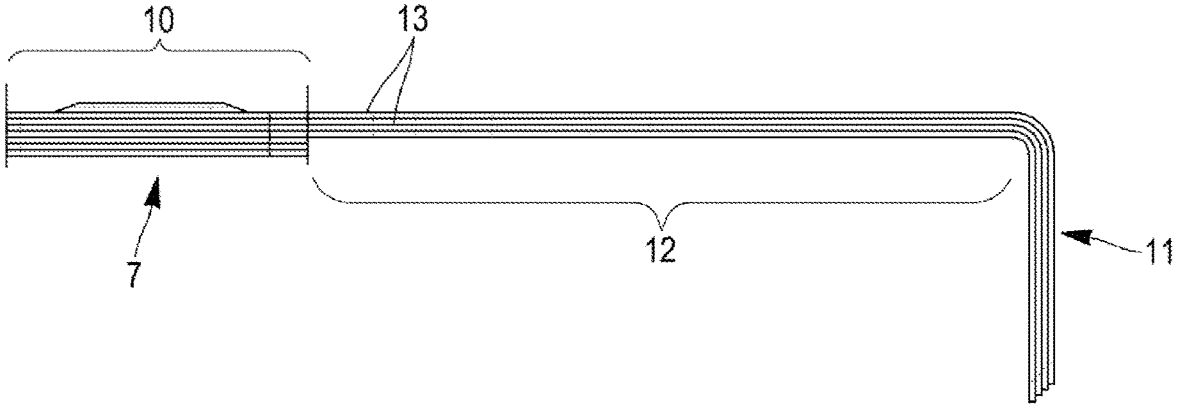
[Fig. 9]
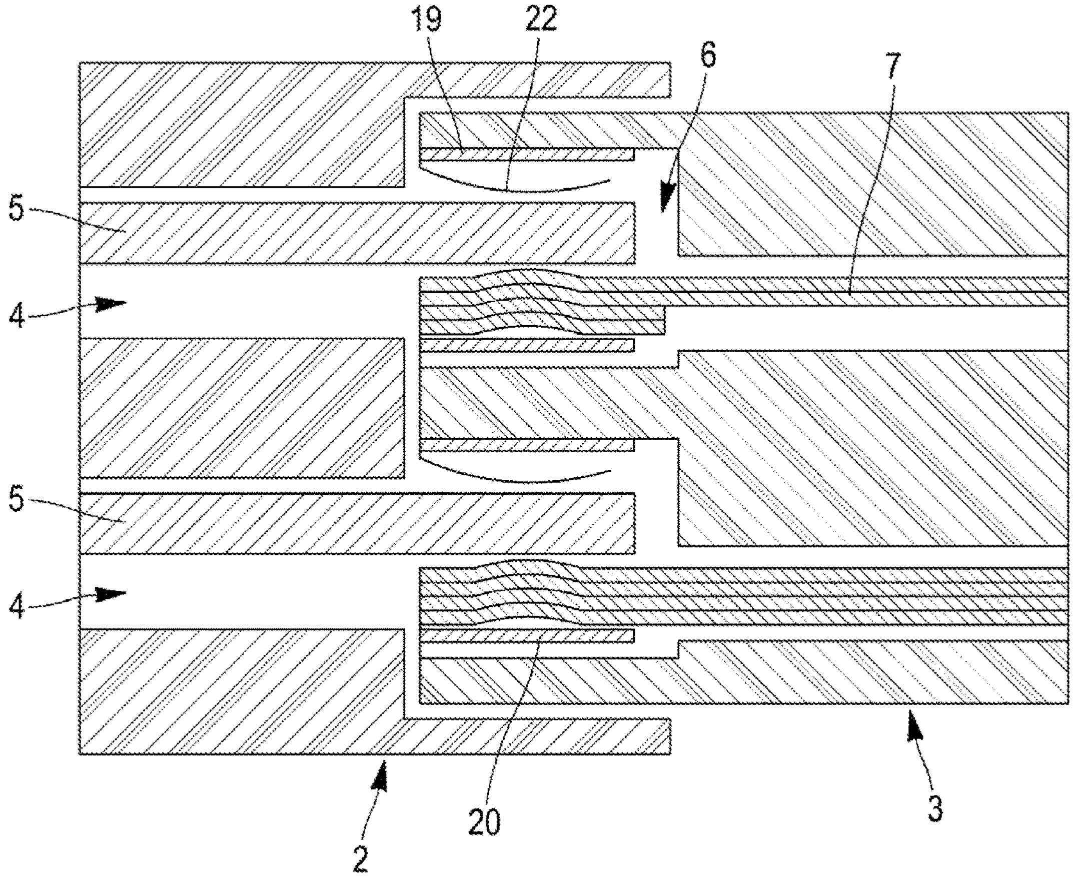

POWER TERMINAL WITH A MULTILAYERED STRUCTURE AND SET OF POWER TERMINALS HAVING VARIOUS NUMBERS OF LAYERS

CROSS-REFERENCE TO RELATED APPLICATION

This application claims benefit of priority to European Patent Application No. 22315023.6 filed on Jan. 26, 2022, the entire disclosure of which is hereby incorporated by reference.

TECHNICAL FIELD OF THE INVENTION

The invention relates to the field of electrical power interconnections in automotive vehicles. For example, the invention relates to power terminals for interconnecting battery cells, converters, charge plugs, motors, etc. in electric or hybrid motor vehicles.

BACKGROUND

Power terminals usually include a contact portion, a connection portion, and an intermediate portion between the two. The current intensity that such power terminals can conduct without excessive temperature rise depends on the cross-section of at least the contact portion. The greater the current intensity that can be conducted by a power terminal, the larger the cross-section of the contact portion. Among the power terminals, there are some in which at least the contact portion has a plate-like shape. The thickness of the plate that can be used for making such a power terminal is also limited by the fact that the greater the thickness, the more operations such as punching, embossing, bending, etc. are difficult. More particularly, for example for copper alloys, a thickness of 3 millimeters of bulk material is a limit which becomes difficult to cross. Therefore, it becomes easier to make power terminals with a greater width, than with a greater thickness. But, increasing the width of a power terminal has more impact on the size of the connector accommodating such a power terminal, than increasing its thickness.

A purpose of this disclosure is to provide a power terminal that can conduct relatively high current intensity without excessive temperature rise and without complexifying excessively its manufacturing.

SUMMARY

According to one or more aspects of the present disclosure, a power terminal includes a contact portion with a main top surface and at least one contact area protruding from the main top surface. The contact area protruding from the main top surface improves the connection between the power terminal and the power terminal of a counter-connector. However, this protrusion results from the embossment or the stamping of the multi-layer structure of the contact portion. It is easier to emboss a multi-layer structure than a bulk structure. Therefore, the manufacturing of the power terminal does not require more sophisticated and/or complex tools even if the thickness of the multi-layer structure is greater than that of a bulk structure. In other words, the cross-section of the contact portion can be increased by increasing the thickness, i.e. the number of layers of the multi-layer structure.

In this document, the terms “embossing”, “embossment”, “embossed” shall be understood with a general meaning corresponding to a deformation of a layer or a plurality of layers, whatever the technology used to achieve this deformation (embossing, stamping, punching, etc.).

According to another aspect of the present disclosure, a set of power terminals is disclosed.

According to yet another aspect of the present disclosure, a connector is disclosed.

BRIEF DESCRIPTION OF THE DRAWINGS

The present invention is now described, by way of example with reference to the accompanying drawings, in which:

FIG. 1 is a cross-section view of a connector assembly according to an embodiment;

FIG. 2 is an isometric view of an example of female power terminal configured to be accommodated in a connector assembly such as the one of FIG. 1 according to an embodiment;

FIG. 3 is a cross-section view of the female power terminal shown in FIG. 2 according to an embodiment;

FIG. 4 is an isometric view of a variation of the contact portion of a female power terminal such as the one shown in FIGS. 2 and 3 according to an embodiment;

FIG. 5 is an isometric view of a variation of the intermediate portion of a female power terminal such as the one shown in FIGS. 2 and 3 according to an embodiment;

FIG. 6 is a side elevation view of a variation of the female power terminal shown in FIGS. 2 and 3 according to an embodiment;

FIG. 7 is a side elevation view of the female power terminal shown in FIGS. 2 and 3 according to an embodiment;

FIG. 8 is a side elevation view of a variation of the female power terminal shown in FIGS. 2 and 3 according to an embodiment; and FIG. 9 is a cross-section view of a variation of the connector assembly shown in FIG. 1 according to an embodiment.

DETAILED DESCRIPTION

A non-limiting example of a connector assembly 1 is shown in FIG. 1. According to this example, the connector assembly 1 includes a male connector 2 and a female connector 3. The male connector 2 has a housing made of dielectric material and which includes a cavity 4 configured for accommodating at least one male power terminal 5. The female connector 3 has a housing made of dielectric material and which includes a cavity 6 configured for accommodating at least one female power terminal 7. When the male 2 and female 3 connectors are mated, the male 6 and female 7 power terminals electrically connect to each other.

As shown on FIGS. 2 and 3, the female power terminal 7 includes a terminal body 8 and a cage 9. The terminal body 8 includes a contact portion 10, a connection portion 11 and an intermediate portion 12 between the contact portion 10 and the connection portion 11.

The terminal body 8 has essentially a plate-like shape. In the illustrated example, the contact portion 10 and the intermediate portion 12 are aligned, whereas the connection portion 11 extends at right angle from the intermediate portion 12. The contact portion 10, the connection portion 11, and the intermediate portion 12 are formed as a multi-layer structure. In the example shown in FIGS. 2 and 3, the contact portion 10 includes eight conductive layers 13, whereas the connection portion 11 and the intermediate portion 12 include six conductive layers 13. For example, each layer 13 is made of a copper alloy. Each layer 13 has a thickness of about 0.5 millimeter (mm). Each layer 13 has a width W of about 35 millimeters. Each layer 13 has two main surfaces delimiting it a direction D corresponding to its thickness. The layers 13 are stacked in a direction D oriented perpendicular to the main surfaces 14, 18 of the contact 10 and intermediate portions 12.

The contact portion 10 includes a main top surface 14 and two contact areas 15 protruding from the main top surface 14. As shown in FIG. 3, each layer 13 of the contact portion 10 includes two first embossed regions 16. The first embossed regions 16 of each layer 13 is registered with the first embossed regions 16 of an adjacent layer. The first embossed regions 16 of the top layer 13A respectively form a contact area 15. In the example illustrated in FIGS. 2 and 3, the female power terminal 7 has two contact areas 15 (each corresponding respectively to a first embossed region 16). Alternatively, the contact portion 10 may include only one contact area 15. Alternatively, as shown in FIG. 4, the contact portion 10 may include more than two contact areas 15 (e.g., twelve contact areas 15 as shown in FIG. 4).

In the intermediate region 12, each layer 13 includes at least one second embossed region 17. In the example illustrated in FIGS. 2 and 3, the female power terminal 7 has four second embossed regions 17. Alternatively, as shown in FIG. 5, the intermediate region 12 may include more or less than four second embossed regions 17 (e.g., eight second embossed regions 17 as shown in FIG. 5). The second embossed regions 17 may result from an embossing process, from a stamping process, or from some other operation adapted for deforming the stacked layers 13. These operations (embossing, stamping or the like) mechanically couple the layers 13 together. They strengthen the multilayer structure and improve the electrical conductivity between adjacent layers 13. The second embossed regions 17 may be embossed or stamped from the main top surface 14 (see FIGS. 2 and 3) or from the main bottom surface 18. Alternatively, as shown in FIG. 5, several second embossed regions 17 may be embossed or stamped from the main top surface 14 and others may be embossed or stamped from the main bottom surface 18 (in other words, each layer 13 of the plurality of conductive layers 13 includes embossed or stamped regions 17 embossed or stamped in opposite directions).

The cage 9 is cut and shaped from sheet metal (e.g., stainless steel). As shown in FIGS. 2 and 3, the cage 9 has a "U" shape, with a top wall 19 and a bottom wall 20, each respectively corresponding to a branch of the "U", and a lateral wall 21 joining the top 19 and bottom 20 walls. An elastic tongue 22 extends from the top wall 19 towards the bottom wall 20. The tongue 22 is configured to allow a male terminal 5 to be inserted between the top wall 19 and the main top surface 14 of the contact portion 10 of the female terminal 7. More particularly, the tongue 22 is configured for pressing a contact portion of the male terminal 5 against the contact areas 15. The cage 9 also includes hooks 23A, 23B, 23C that are configured for maintaining the cage 9 on the plurality of conductive layers 13 of the contact portion 10. The hooks 23A, 23B, 23C can also help to maintain the layers 13 assembled together. In the example shown in FIGS. 2 and 3, there are a front hook 23A and a lateral hook 23B, each one respectively engaging a notch 24A or 24B cut in the layers 13 of the contact portion 10. These front 23A and lateral 23B hooks do not cover the main top surface 14. Possibly, since the contact areas 15 protrude from the main top surface 14, the front hook 23A can stick-out further than the main top surface 14, while remaining below the top of the contact areas 15. The lateral hook 23B is advantageously flush with the main top surface 14. The cage 9 also include two rear hooks 23C which come back over the main top surface 14 and catch the layers 13 together. The rear hooks 23C may also serves for blocking a forward movement of the male terminal 5. Each rear hook 23C is inserted behind a shoulder 25 cut in the layers 13 and located behind the contact portion 10.

FIGS. 6 to 8 show various versions of a set of female power terminals 7 (without a cage). The three versions shown in FIGS. 6 to 8 differ from each other by the number of conductive layers 13 stacked in the intermediate portion 12 and the connection portion 11. For example, the female power terminal 7 shown in FIG. 6 includes eight layers 13, in the contact portion 10, as well as in the intermediate portion 12 and in the connection portion 11. Therefore, the cross-section of these contact portion 10, connection portion 11 and intermediate portion 12 is about 8 times 0.5 times the width of the female power terminal 7 (e.g., if the width is about 25 mm, the cross-section is about $8\times0.5\times25=100$ $mm^2$). Such a female power terminal 7 is adapted for conducting currents up to 450 amperes without exceeding a temperature of 85° C. The female power terminal 7 shown in FIG. 7 includes eight layers 13 in the contact portion 10, but only six layers in the intermediate portion 12 and in the connection portion 11. Therefore, the cross-section of the contact portion 10 remains the same as in the version of FIG. 6, but the cross-section of the connection portion 11 and intermediate portion 12 is about 6 times 0.5 times the width of the female power terminal 7 (e.g., if the width is about 25 mm, the cross-section is about $6\times0.5\times25=75$ $mm^2$). Such a female power terminal 7 is adapted for conducting currents up to 400 amperes without exceeding a temperature of 85° C. The female power terminal 7 shown in FIG. 8 includes eight layers 13 in the contact portion 10, but only four layers in the intermediate portion 12 and in the connection portion 11. Therefore, the cross-section of the contact portion 10 remains the same as in the versions of FIGS. 6 and 7, but the cross-section of the connection portion 11 and intermediate portion 12 is about 4 times 0.5 times the width of the female power terminal 7 (e.g., if the width is about 25 mm, the cross-section is about $4\times0.5\times25=50$ $mm^2$). Such a female power terminal 7 is adapted for conducting currents up to 250 amperes without exceeding a temperature of 85° C.

In the power terminals 7 shown in FIGS. 6 to 8, the thickness of the contact portion 10 is greater than 3 mm. It is advantageous to have a thicker portion where the contact between the male 5 and female 7 power terminals is. Indeed, the temperature may rise at the contact points (i.e., in the contact areas 15) more than elsewhere.

In the set of female power terminals 7 shown in FIGS. 6 to 8, each one of the three terminals has N (with N=8) conductive layers 13 stacked in the contact portion 10. The female power terminal 7 shown in FIG. 6 has N conductive layers 13 stacked in the intermediate portion 12 and the connection portion 11. The female power terminal 7 shown in FIG. 7 has N−2, i.e., 6 conductive layers 13 stacked in the intermediate portion 12 and the connection portion 11. The female power terminal 7 shown in FIG. 8 has N−4, i.e., 4 conductive layers 13 stacked in the intermediate portion 12 and the connection portion 11. More generally, if the number of conductive layers 13 stacked in the contact portion 10 is a positive integer N, the number of conductive layers 13 stacked in the intermediate portion 12 and/or the connection portion 11 is N-n, where n is chosen as a positive integer less than than N.

The set of female power terminals 7 disclosed above has the advantage in that it allows the number of conductive layers 13 to be adapted to the application (i.e., to adapt the cost), while keeping the same interface both for the male power terminal 5 and the male 2 and female 3 connectors.

A connector, for example a female connector 3, can accommodate one or several female power terminals 7 of this set of female terminals 7. When this connector 3 accommodates several terminals 7, the several female power terminals 7 can be the same, the several female power terminals 7 can differ by the number of conductive layers 13 stacked in the intermediate portion 12 and the connection portion 11, whereas the number of conductive layers 13 stacked in the contact portion 10 are the same as shown in FIG. 9.

The above disclosure relates to a female power terminal 7 but it can easily be adapted to male power terminals 5.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A power terminal, comprising:

a contact portion;

a connection portion; and an intermediate portion disposed between the contact portion and the connection portion, wherein the contact and intermediate portions include a plurality of conductive layers stacked along a direction corresponding to their respective thicknesses, wherein the contact portion includes a main top surface that is perpendicular to the stacking direction and at least one contact area protruding from the main top surface, wherein each layer of the plurality of conductive layers in the contact portion comprises at least one first embossed region, wherein the at least one first embossed region of each layer is registered with the at least one first embossed region of an adjacent layer, and wherein the at least one first embossed region of a top layer forms the at least one contact area, wherein each layer of the plurality of conductive layers comprises at least one second embossed region in the intermediate portion configured to couple the plurality of conductive layers together.

2. The power terminal according to claim 1, wherein the number of conductive layers stacked in the contact portion differs from the number of conductive layers stacked in the intermediate portion or the connection portion.

3. The power terminal according to claim 1, wherein each layer of the plurality of conductive layers comprises embossed regions embossed in opposite directions.

4. The power terminal according to claim 1, wherein a thickness of the contact portion is greater than 3 mm.

5. A female power terminal, comprising:

a contact portion;

a connection portion;

an intermediate portion disposed between the contact portion and the connection portion, wherein the contact and intermediate portions include a plurality of conductive layers stacked along a direction corresponding to their respective thicknesses, wherein the contact portion includes a main top surface and at least one contact area protruding from the main top surface, wherein each layer of the plurality of conductive layers in the contact portion comprises at least one first embossed region, wherein the at least one first embossed region of each layer is registered with the at least one first embossed region of an adjacent layer, and wherein the at least one first embossed region of a top layer forms the at least one contact area; and a cage having at least one elastic tongue configured for pressing a contact portion of a male terminal against the at least one contact area, wherein the cage has at least one hook configured for maintaining the cage on the plurality of conductive layers of the contact portion of the female terminal.

6. A set of power terminals, each comprising:

at least two terminals according claim 1, a contact portion;

a connection portion; and an intermediate portion disposed between the contact portion and the connection portion, wherein the contact and intermediate portions include a plurality of conductive layers stacked along a direction corresponding to their respective thicknesses, wherein the contact portion includes a main top surface and at least one contact area protruding from the main top surface, wherein each layer of the plurality of conductive layers in the contact portion comprises at least one first embossed region, wherein the at least one first embossed region of each layer is registered with the at least one first embossed region of an adjacent layer, wherein the at least one first embossed region of a top layer forms the at least one contact area, and wherein these two terminals differ from each other by the number of conductive layers stacked in the intermediate portion or the connection portion and wherein the number of conductive layers stacked in the contact portion is the same for both terminals.

7. The set of power terminals according to claim 6, comprising at least three terminals, each one having N conductive layers stacked in the contact portion, one having N conductive layers stacked in the intermediate portion or the connection portion, one having N−2 conductive layers stacked in the intermediate portion or the connection portion, and one having N−4 conductive layers stacked in the intermediate portion or the connection portion.

8. The set of power terminals according to claim 7, wherein cross-sections of the at least three terminals are about 100 $mm^2$, 75 $mm^2$, and 50 $mm^2$ respectively.

9. The set of power terminals according to claim 6, wherein a width of the contact portion of all terminals is essentially the same.

10. A connector, comprising:

a set of power terminals according to claim 9 accommodated in a cavity formed in a housing made of dielectric material.

* * * * *